United States Patent
Morton

(12) United States Patent (10) Patent No.: US 6,365,221 B1
(45) Date of Patent: Apr. 2, 2002

(54) COMPUTER CONTROLLED METHOD AND APPARATUS FOR FAIRING AND PAINTING OF MARINE VESSEL SURFACES

(75) Inventor: John Stephen Morton, Fort Lauderdale, FL (US)

(73) Assignee: Visions East, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/447,973

(22) Filed: Nov. 23, 1999

(51) Int. Cl.[7] .......................... B05C 13/00; B32B 35/00
(52) U.S. Cl. ...................................... 427/140; 427/142
(58) Field of Search .................. 427/140, 142

(56) References Cited

U.S. PATENT DOCUMENTS

| | | | |
|---|---|---|---|
| 4,498,414 A | 2/1985 | Kiba et al. ................ 118/663 |
| 4,532,148 A | 7/1985 | Vecellio ................... 427/31 |
| 4,599,967 A * | 7/1986 | Murphy et al. ............. 118/72 |
| 4,649,858 A * | 3/1987 | Sakai et al. ............... 118/697 |
| 4,693,664 A * | 9/1987 | Schweiker ................. 414/735 |
| 4,986,664 A * | 1/1991 | Lovoi ..................... 356/376 |
| 5,067,085 A * | 11/1991 | Wenzel et al. ............. 364/474.06 |
| 5,336,304 A | 8/1994 | Andoe .................... 106/18.32 |
| 5,571,312 A | 11/1996 | Andoe .................... 106/18.32 |
| 5,737,227 A | 4/1998 | Greenfield et al. ......... 364/464.1 |
| 5,947,051 A * | 9/1999 | Geiger .................... 114/313 |
| 5,979,001 A * | 11/1999 | Marrero .................. 15/53.1 |
| 5,997,951 A * | 12/1999 | Hein ...................... 427/299 |
| 6,189,473 B1 * | 2/2001 | Appel et al. .............. 114/222 |

OTHER PUBLICATIONS

Pike, Capt. Bill, "Special Ops", *Power& Motoryacht*, Sep. 1999, pp. 96–101.

Barry, Christopher, "CAD/CAM and Fiberglass Tooling", *Professional Boatbuilder*, Oct/Nov. 1999, p102.

* cited by examiner

Primary Examiner—Shrive P. Beck
Assistant Examiner—Jennifer Kolb Michener
(74) Attorney, Agent, or Firm—Stanley J. Yavner

(57) ABSTRACT

A computer controlled method utilizing robots for the fairing and painting of marine vessel surfaces comprising the steps of analyzing the vessel hull and/or superstructure for imperfections; applying a fairing compound to the imperfections; smoothing the imperfections into alignment with the hull and/or superstructure; and applying a final paint finish to the hull and/or superstructure.

4 Claims, 4 Drawing Sheets

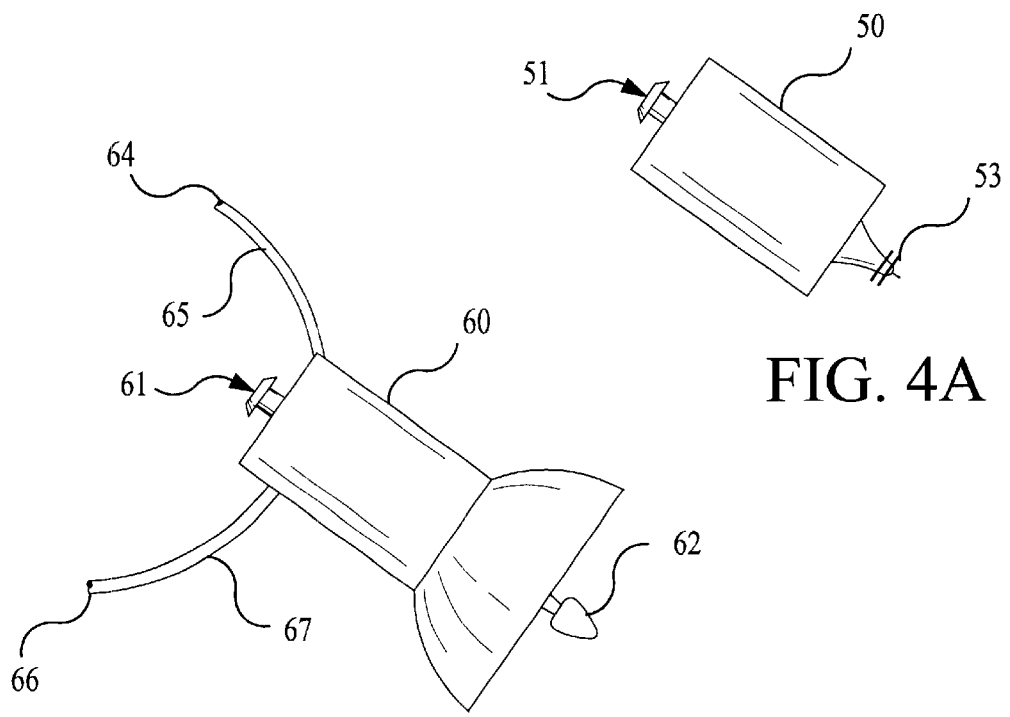
FIG. 4A
FIG. 4B
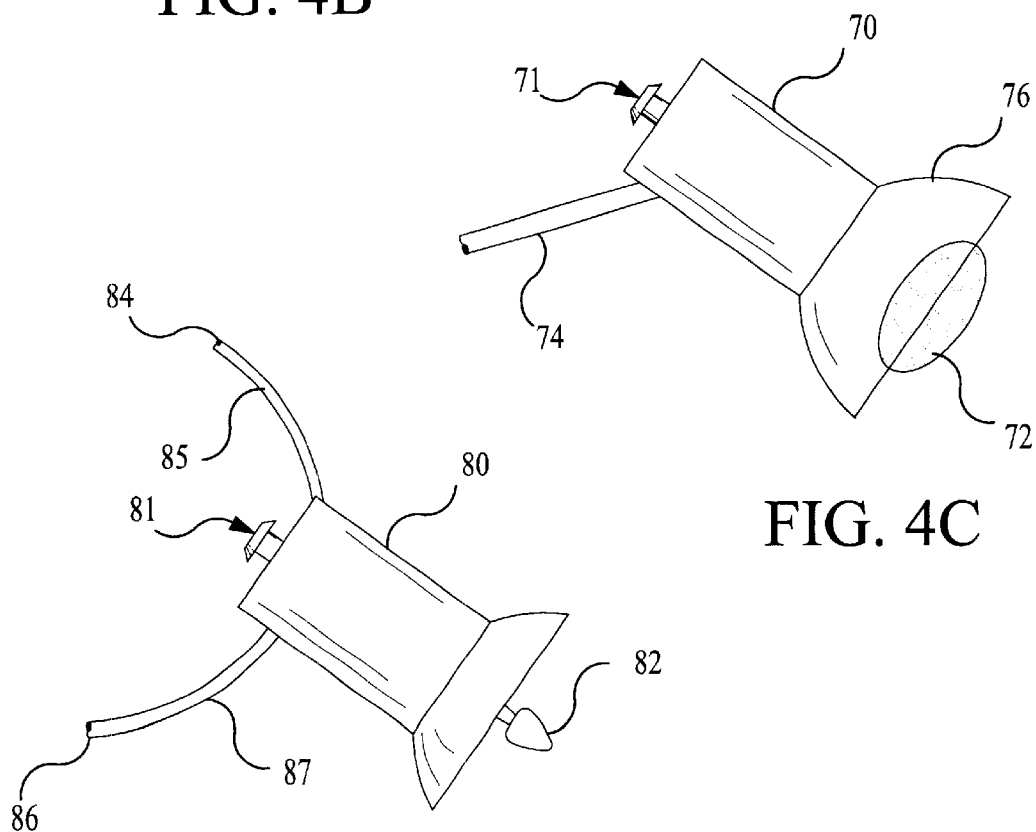
FIG. 4C
FIG. 4D

COMPUTER CONTROLLED METHOD AND APPARATUS FOR FAIRING AND PAINTING OF MARINE VESSEL SURFACES

FIELD OF INVENTION

The present invention generally relates to automated fairing and painting of marine vessels, and the present invention specifically relates to the use of computer controlled robotic equipment for analyzing surface imperfections, fairing, applying a sprayable fairing compound, and painting.

BACKGROUND OF INVENTION

Custom marine vessels are constructed today using time proven techniques and methods. Part of this process is known as fairing. Fairing is a process whereby a less than smooth surface is filled, sanded and primed in preparation for painting. Fairing, as applied in the marine industry, is done almost exclusively on the exteriors of yachts, where the greatly enhanced aesthetic quality of paint on a professionally faired hull or superstructure imparts a uniform mirror like quality to the paint finish. Commercial or military marine vessels are almost never faired due to the cost and time involved as well as the purely aesthetic nature of such a process.

Fairing is accomplished by analyzing a marine vessel's exterior surface for imperfections and then utilizing certain techniques for removing the imperfections from the hull or superstructure. Traditionally, a crew of skilled craftsmen using hand operated air tools, hand operated electric tools, simple hand tools or any combination thereof has performed this process. The first step is to analyze the imperfections in the hull or superstructure surface by using a straight edged, elongated board or batten to "map" or mark imperfections in the vessel surface. The next step involves applying a primer, usually a spray applied primer. After the "mapping" and priming steps, any imperfections greater than approximately ⅛" in depth are manually filled with trowelable fairing compound, applied using hand trowels and long metal spreaders. When the troweled filler has cured, it is hand sanded using hand blocks and "longboards" with sandpaper attached and with manually operated power sanders. When the surface being faired is relatively smooth and fair, a final optional application of sprayable fairing compound may be applied using manually operated spray equipment. Once all of the fairing compound has been applied and manually sanded,, priming and painting the faired hull or superstructure then completes the fairing and painting process.

Using current methods, a surface with 5,000 square feet of fairable area takes approximately 2.2 man-hours per square foot or 11,000 total man-hours to fair from an unfaired surface to a high quality, i.e. "yacht quality", painted finish. Related industries, such as the automobile manufacturing industry, have attempted to solve the inefficiency corresponding to large tasks performed by hand, by automating certain aspects of production. For example, U.S. Pat. No. 4,532,148, to Veciello, describes an automated painting system for automobiles performed primarily by robots with rotary bell-type atomizing devices attached to the robot arm. While this invention is adequate for painting mass-production automobiles, it only serves to paint.

U.S. Pat. No. , 4,498,414, to Kiba, et al., describes an automobile painting robot. This robot was designed to paint automobiles on an assembly line with the additional feature of being able to open the car door for greater access for painting.

While the above patents relate to automated painting robots and a system for painting with robots, U.S. Pat. No. 5,571,312, to Andoe, describes a coating material that could be applied by the robots to a marine vessel.

None of the above references, each of which is incorporated herein by reference, describe a method for fairing a marine vessel. In addition, the marine vessel industry has not devised an automated method to save the time and expense expended in fairing a vessel hull and superstructure.

As a consequence, there is a need in the art for a method of automated fairing of marine vessels in order to save time and expense, and to ensure precision fairing.

There is a further need in the art for a method of automated fairing that employs multi-function robots with interchangeable operative heads.

SUMMARY OF INVENTION

The present invention satisfies the needs in the art by providing automation technology to analyze, fair and paint the hulls and superstructures of marine vessels in order to save material cost, labor and to provide computer-controlled precision fairing.

The preferred embodiment of the invention is a computer-implemented method for fairing the hull or superstructure of a marine vessel, utilizing a robot system which includes multiple robots positioned on moveable means and having arms provided with various attachments, moveable about various control axes, comprising the steps of positioning the marine vessel so as to provide the robots access to the hull and superstructure; analyzing the vessel's hull and superstructure for imperfections; applying a fairing compound to the imperfections; sanding the fairing compound in alignment with the hull or superstructure; removing any compound dust generated by the sanding process; and priming and painting the hull or superstructure.

In another preferred embodiment the robots are positioned on glide tracks or a gantry for movement.

In another preferred embodiment the robots are provided with arms adaptable for affixing and using various attachments.

In another preferred embodiment the analyzing step further comprises using a surface mapping system utilizing lasers, affixed to the robot.

In another preferred embodiment the analyzing step further comprises using a surface mapping system utilizing radar, affixed to the robot.

In another preferred embodiment the fairing compound application step further comprises using a spraying apparatus, affixed to the end of the robot arm.

In another preferred embodiment the fairing step further comprises using a milling apparatus and vacuum apparatus in conjunction with one another, affixed to end of the robot arm.

In another preferred embodiment the painting step further comprises using a second spraying apparatus, affixed to the end of the robot arm.

In another preferred embodiment the steps further comprise using interchangeable attachments for use by the robots.

Accordingly, it is an object of the invention to use robots to analyze the imperfections in a marine vessel's hull or superstructure by utilizing a surface mapping laser or radar.

It is a further object of the invention to use robots to apply any sprayable fairing compound as may be necessary to correct the detected imperfections in a marine vessel's hull or superstructure by utilizing spraying equipment to apply the compound.

Another object of the invention is to use robots to sand the fairing compound once it has been applied to the vessel in order to achieve a smooth surface by use of a milling or sanding head.

A still further object of the invention is to remove, from the work area, the fairing compound dust created by the sanding process by a vacuum tube or other similar cleaning means.

A still further object of the invention is to use robots to apply the final paint coat to the vessel surface by utilizing spraying equipment to apply the paint.

A still further object is to provide moveable means for the robots for the purpose of allowing the robots complete access to the vessel's hull and superstructure surfaces.

Another object of the invention is to provide the robots with interchangeable heads for accomplishing the tasks of analyzing the hull for imperfections, applying fairing compound, sanding the hull and painting.

The above objects and advantages of the present invention will become apparent from the following description and appended claims, taken in conjunction with the accompanying drawings which show by way of example some preferred embodiments of the invention.

BRIEF DESCRIPTION OF THE DRAWINGS

FIGS. 4A–4D are perspective views of the various heads to be used in conjunction with the robots according to the present invention.

DETAILED DESCRIPTION OF INVENTION

Figure 1:
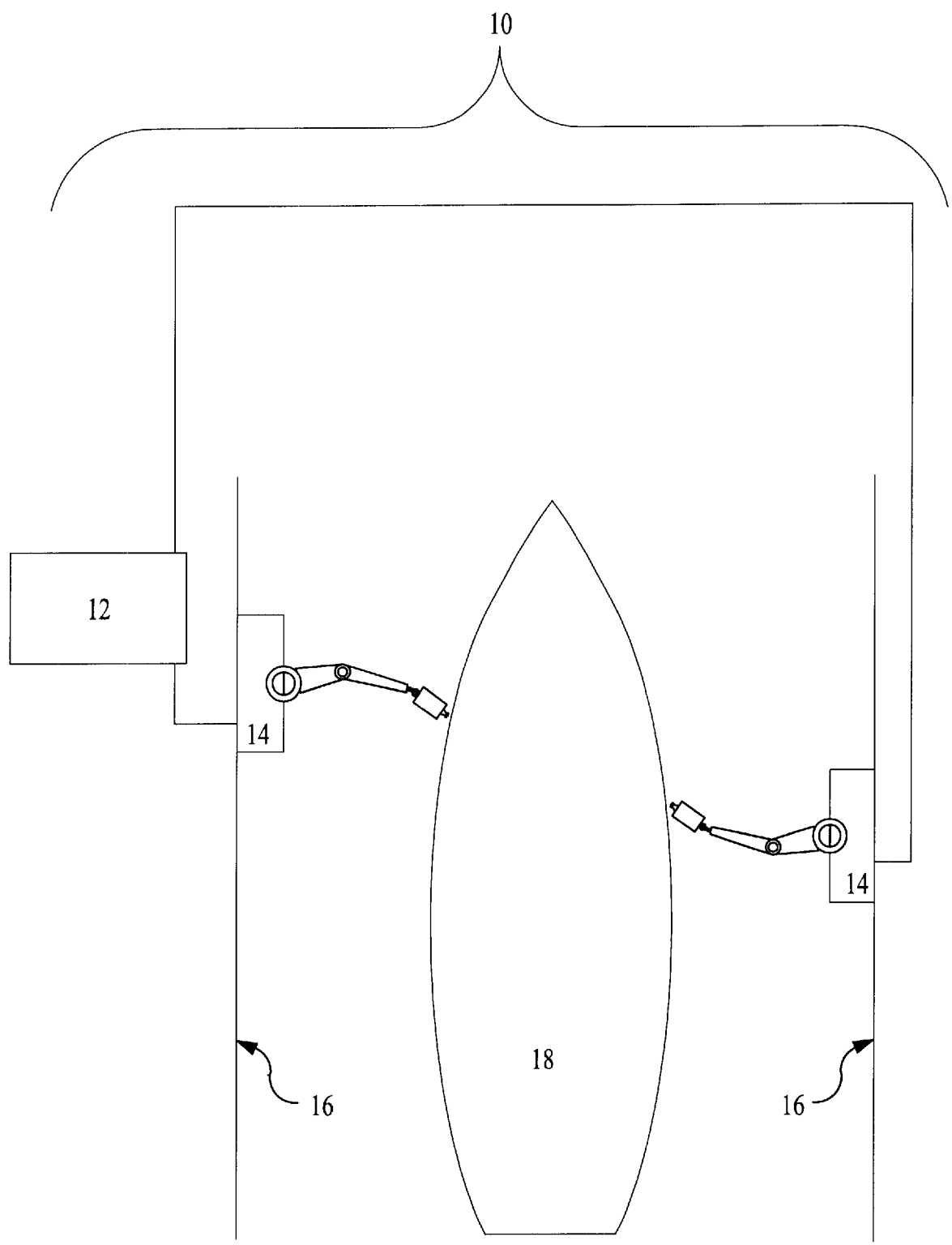
FIG. 1 is a plan view of a vessel located in the operational area of the automated fairing system and approximate layout of said system according to the present invention.

Referring to the drawings, and more particularly FIG. 1 thereof, an automated fairing system 10 is shown which includes a controller 12 for directing the movement of robots 14. Said controller is capable of receiving various electrical input signals for initiating the operation of the robots 14 in accordance with a preprogrammed sequence of operation. The robots 14 are located on parallel tracks 16 for movement along the longitudinal axis of the marine vessel 18. The vessel 18 is situated in the operational area of the robots 14, between the tracks 16, allowing said robots complete access along the length of the vessel 18.

Figure 2:
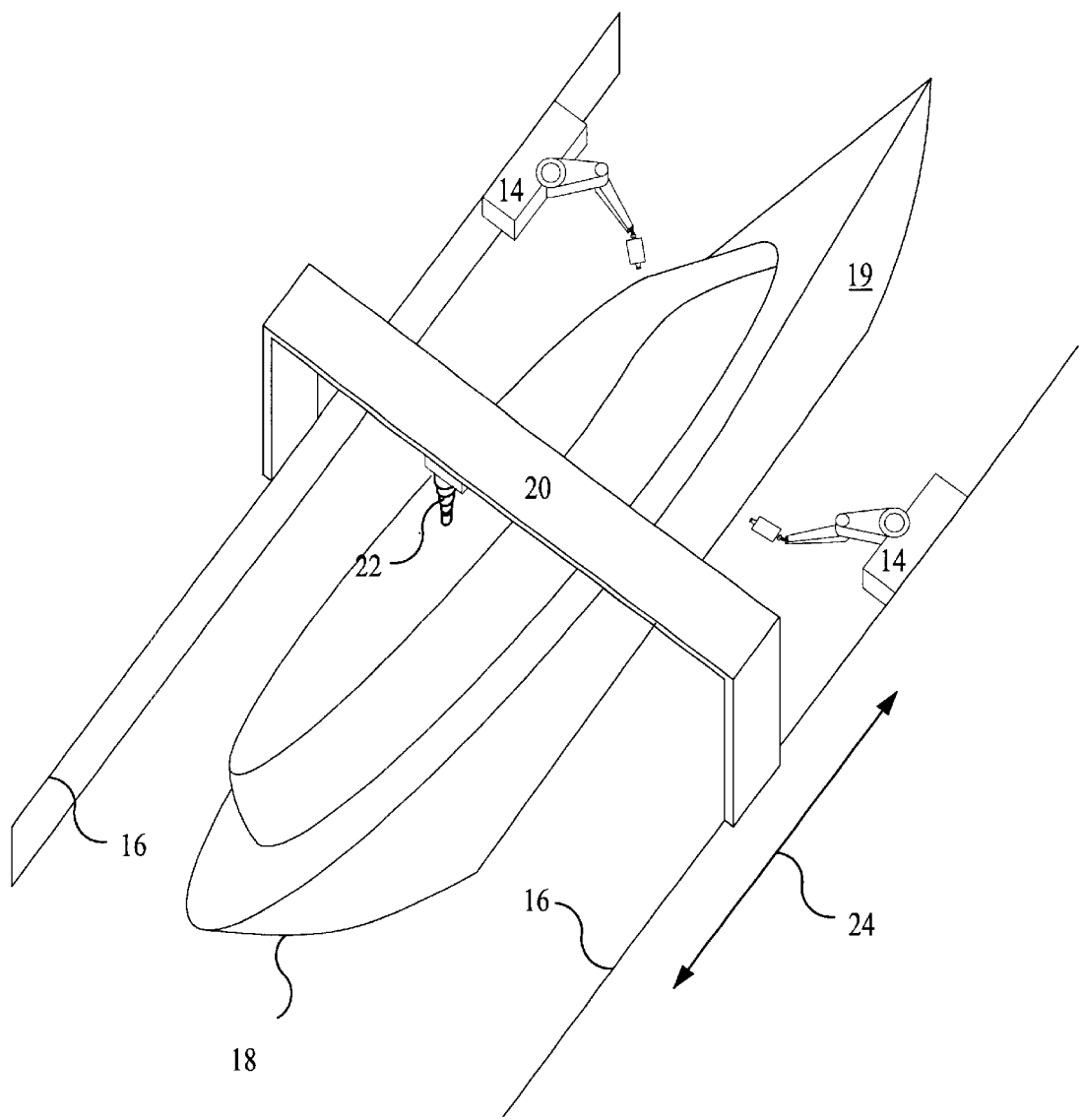
FIG. 2 is a perspective view of the automated fairing system including a gantry mounted robot, according to a preferred embodiment.

FIG. 2 represents a perspective view of an alternative embodiment of the system 10, in which the robots 14 on tracks 16 can be seen working on the vessel 18 in conjunction with a gantry 20 and gantry mounted robot 22, said gantry 20 and gantry mounted robot 22 are also controlled by the controller 12. According to the alternative embodiment, the gantry 20 would have the capability of linear movement 24 up and down the longitudinal axis of the vessel 18 and the robot 22 on the gantry 20 is would have side to side movement and telescoping means 35 to raise or lower to the work surface. As stated in the description of FIG. 1, this invention operates with, and the apparatus thereof includes, robots 14 (FIG. 1), without a gantry 20. Additionally, when using gantry 20, various alternative structures are operative within the bounds of this invention, such as when the "legs", as are shown in FIG. 2, or with "legs" as shown but suspending the gantry from above.

Figure 3:
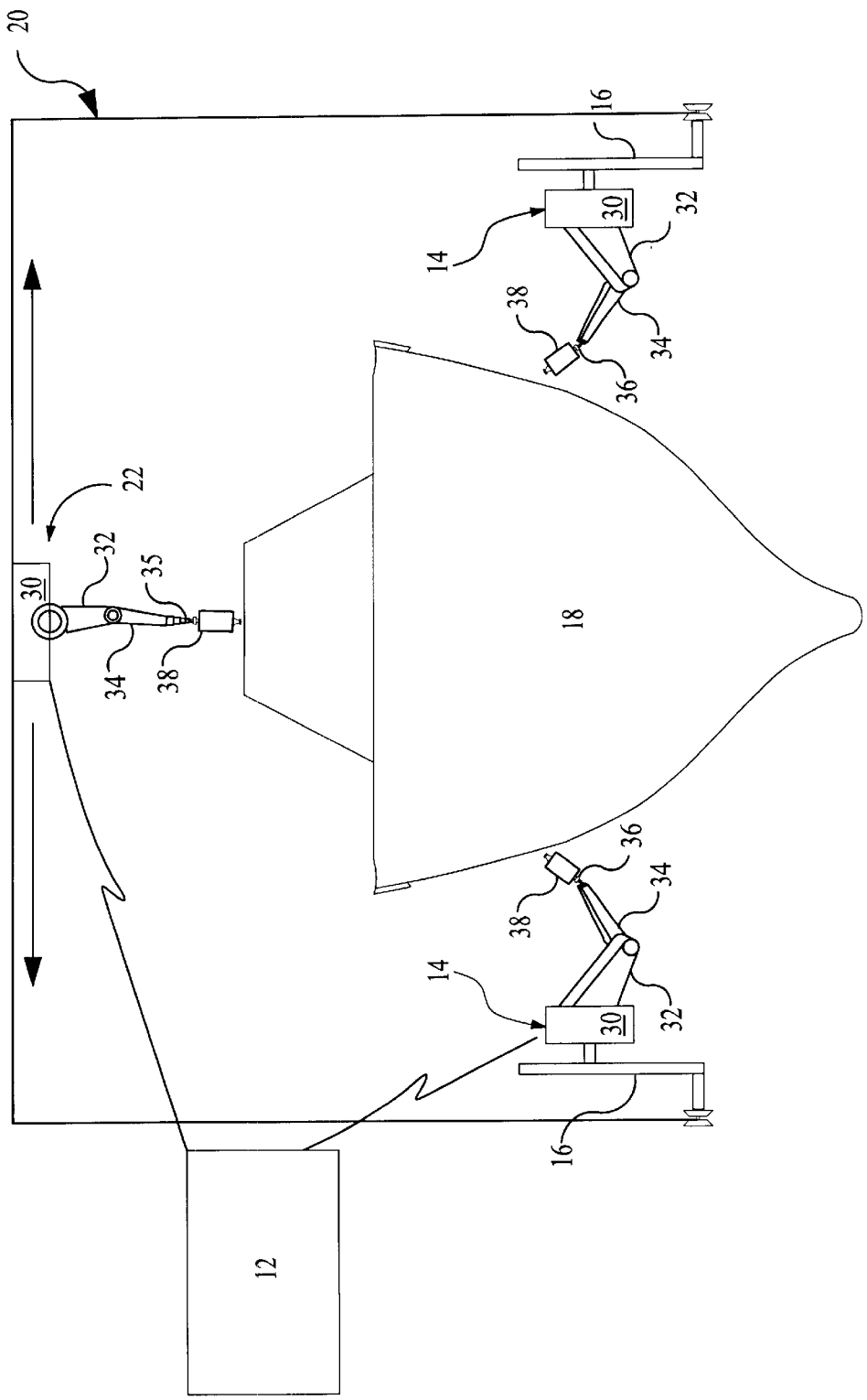
FIG. 3 is an elevational side view illustrating a track mounted fairing robot and a gantry mounted robot as utilized in the automated fairing system and method according to the present invention.

As can be seen in FIG. 3, the robots, 14 and 22, are hydraulically operated units which include a base 30, a primary arm 32, a secondary arm 34 and a wrist 36 that terminates in a support head 38, which interlocks with any one of the interchangeable tools 50, 60, 70 and 80. The controller 12 and the base 30, the primary arm 32, the secondary arm 34, the wrist 36, the support head 38 and the interchangeable tools 50, 60, 70, and 80 are operatively connected for achieving the end result of movement of the interchangeable tools 50, 60, 70, and 80 in a desired manner.

FIGS. 4A–4D illustrate the various interchangeable tools 50, 60, 70, and 80 as utilized in the automated fairing system 10. The optional analyzer tool 50 in FIG. 4A is used for analyzing the vessel's surface 19, through the use of surface mapping laser or radar 53, This tool is affixed using a connective means 51 which interlocks with wrist 36. The analyzing process may be accomplished with the analyzing means attached to the base 30 of the robots 14 and 22 rather than at the end of the secondary arm 34.

The fairing compound application tool 60 in FIG. 4B, employs a spray nozzle 62 supplied with compressed air 64 and fairing compound 66 through hoses 65 and 67 respectively. The tool is affixed using a connective means 61 that interlocks with the wrist 36.

FIG. 4C portrays an interchangeable sanding tool 70 useable for sanding the areas treated with fairing compound 66. The tool uses a means for sanding 72 in conjunction with a vacuum hose 74 for the removal of the toxic dust created from smoothing the fairing compound 66. A hood 76 encloses the sanding means 72 and the vacuum hose 74 the vacuum hose projecting through the tool 70 and within the hood 76, proximate sanding means 72, which is not shown in the drawing of FIG. 4C for the sake of clarity, but is to be understood that way, as previously described herein. The hood 76 is used to prevent the dust from escaping and is also used to enhance the suction capability of the vacuum 74. The sanding tool 70 is interchangeably affixed to the wrist 36 by a connective means 71. Also, usable for cleaning the surfaces, analyzed and treated with fairing compound 66, are various alternative means; e.g. a water-blasting means is used in one of the tools, but this requires sufficient connections for handling water, and this potentially requires a drying means for use after the water-blasting or power-washing. When water-blasting is used for cleaning, the pressure is adjusted for the size of the vessel (less for a yacht, than for a large ship). Furthermore, particularly with large ships, the present invention method involves only the steps of positioning the vessel, cleaning with water-blasting, and analyzing for imperfections or contours before repairing and/or painting.

An interchangeable painting tool 80 is shown in FIG. 4D, a perspective view. Paint 86 is applied through a spray nozzle 82 that is supplied by hoses 85 and 87 with compressed air 84 and paint 86 respectively. The painting tool 80 is interchangeably affixed to the wrist 36 by a connective means 81.

It will be understood that the preferred embodiments of the present invention has been disclosed by way of example and that other modifications and alterations may occur to those skilled in the art without departing from the scope and spirit of the appended claims.

What is claimed is:

1. A computer-implemented method for fairing and painting the entire hull and/or superstructure of a marine vessel, utilizing a robot system which includes multiple robots positioned on moveable means and having arms provided with various attachments, moveable about various control axes, comprising the steps of:

A. Positioning said marine vessel so as to provide said robots access to said hull and superstructure;
   B. Analyzing said vessel's hull and superstructure for imperfections, wherein this analyzing step includes utilizing lasers, affixed to the robots, in a surface mapping system;
   C. Applying a fairing compound to said imperfections;
   D. Sanding said fairing compound in alignment with said hull and/or superstructure;
   E. Removing any compound dust generated by the sanding process; and
   F. Painting said hull and/or superstructure.

2. A computer-implemented method for fairing and painting the entire hull and/or superstructure of a marine vessel, utilizing a robot system which includes multiple robots positioned on moveable means and having arms provided with various attachments, moveable about various control axes, comprising the steps of:

A. Positioning said marine vessel so as to provide said robots access to said hull and superstructure;
   B. Analyzing said vessel's hull and superstructure for imperfections, wherein this analyzing step includes utilizing radar, affixed to the robots, in a surface mapping system;
   C. Applying a fairing compound to said imperfections;
   D. Sanding said fairing compound in alignment with said hull and/or superstructure;
   E. Removing any compound dust generated by the sanding process; and
   F. Painting said hull and/or superstructure.

3. A computer-controlled method for finishing at least the entire hull of a marine vessel, involving a computer for directing the movement of robots, said robots positioned on movable means, such as a gantry, tracks and/or a gantry-tracks combination, each of said robots having a base, a primary arm, a secondary arm and a wrist terminating in a support head, and various tools attachable to said wrists or said bases, the method comprising the steps of:

(a) positioning said marine vessel, relative to said robots, so that said robots are operatively accessible to surfaces defined by said marine vessel;
   (b) attaching and using an analyzer tool on each of said robots for analyzing the surfaces of said marine vessel to detect contours and imperfections, wherein this analyzing step includes the production of a surface map by the use of lasers attached to said robots;
   (c) attaching and using a surface sensing tool on each of said robots for preparing said surfaces for painting; and
   (d) attaching and using a painting tool on each of said robots for painting said surfaces.

4. A computer-controlled method for finishing at least the entire hull of a marine vessel, involving a computer for directing the movement of robots, said robots positioned on movable means, such as a gantry, tracks and/or a gantry-tracks combination, each of said robots having a base, a primary arm, a secondary arm and a wrist terminating in a support head, and various tools attachable to said wrists or said bases, the method comprising the steps of:

(a) positioning said marine vessel, relative to said robots, so that said robots are operatively accessible to surfaces defined by said marine vessel;
   (b) attaching and using an analyzer tool on each of said robots for analyzing the surfaces of said marine vessel to detect contours and imperfections, wherein this analyzing step includes the production of a surface map by the use of radar attached to said robots;
   (c) attaching and using a surface sensing tool on each of said robots for preparing said surfaces for painting; and
   (d) attaching and using a painting tool on each of said robots for painting said surfaces.

* * * * *